United States Patent
White

(10) Patent No.: US 6,457,629 B1
(45) Date of Patent: Oct. 1, 2002

(54) OBJECT CONSOLIDATION EMPLOYING FRICTION JOINING

(75) Inventor: Dawn White, Ann Arbor, MI (US)

(73) Assignee: Solidica, Inc., Ann Arbor, MI (US)

( * ) Notice: Subject to any disclaimer, the term of this patent is extended or adjusted under 35 U.S.C. 154(b) by 112 days.

(21) Appl. No.: 09/679,163

(22) Filed: Oct. 4, 2000

Related U.S. Application Data

(60) Provisional application No. 60/157,572, filed on Oct. 4, 1999.

(51) Int. Cl.$^7$ ............................. B23K 20/12; B23K 31/02
(52) U.S. Cl. ................................. 228/112.1; 228/114.5; 228/185; 228/2.3
(58) Field of Search ........................... 228/112.1, 114.5, 228/159, 160, 163, 170, 185, 2.1, 2.3, 49.2; 219/76.1, 76.12, 137 R, 137.2

(56) References Cited

U.S. PATENT DOCUMENTS

| | | | |
|---|---|---|---|
| 4,327,156 A | 4/1982 | Dillon et al. | 428/568 |
| 4,775,092 A | 10/1988 | Edmonds et al. | 228/222 |
| 4,905,883 A | * 3/1990 | Searle | 228/2.1 |
| 4,930,675 A | 6/1990 | Bedford et al. | 228/112 |
| 4,959,241 A | 9/1990 | Thomas et al. | 427/11 |
| 5,077,081 A | 12/1991 | Bedford | 427/11 |
| 5,126,529 A | 6/1992 | Weiss et al. | 219/121.6 |
| 5,183,390 A | 2/1993 | Amos | 416/224 |
| 5,207,371 A | 5/1993 | Prinz et al. | 228/125 |
| 5,387,380 A | 2/1995 | Cima et al. | 264/69 |
| 5,469,617 A | 11/1995 | Thomas et al. | 29/889.21 |
| 5,470,651 A | 11/1995 | Milinkovic et al. | 428/325 |
| 5,578,227 A | 11/1996 | Ravinovich | 219/121.63 |
| 5,614,075 A | 3/1997 | Andre, Sr. | 205/67 |
| 5,827,368 A | * 10/1998 | Stango | 118/244 |
| 5,961,862 A | 10/1999 | Lewis et al. | 219/121.84 |
| 5,976,339 A | 11/1999 | Andre, Sr. | 205/70 |
| 6,025,014 A | * 2/2000 | Stango | 427/11 |

OTHER PUBLICATIONS (author unknown) Welding Handbook, vol. 2, Chapter 25, 1991.

* cited by examiner

*Primary Examiner*—Tom Dunn
*Assistant Examiner*—Colleen P. Cooke
(74) *Attorney, Agent, or Firm*—Gifford, Krass, Groh, Sprinkle, Anderson & Citkowski, PC

(57) ABSTRACT

Friction heating and bonding are used to consolidate sequentially applied metals, plastics or composites to previously deposited material so as to form a bulk deposit in a desired shape. Monolithic or composite sheets, tapes and filaments can be consolidated using the approach. A system according to the invention includes a source of friction; a mechanism for applying a forging load between a feedstock power supply and a work surface; a work-head, which may have various configurations depending on the geometry of the feedstock to be used; a material feeding system; and a computer-controlled actuation system which controls the placement of material increments added to an object being built. A computer model of the object to be built is used to generate commands to produce the object additively and automatically. The approach provides a solid, freeform fabrication technique that requires no tooling, operates in the solid state, and creates a bond directly at the faying surfaces (i.e., acts only at the location where bonding/consolidation of the material increments is desired).

25 Claims, 8 Drawing Sheets

OBJECT CONSOLIDATION EMPLOYING FRICTION JOINING

REFERENCE TO RELATED APPLICATIONS

This application claims priority of U.S. provisional patent application Serial No. 60/157,572 filed Oct. 4, 1999, the entire contents of which are incorporated herein by reference.

FIELD OF THE INVENTION

The present invention relates generally to fabrication of objects and prototypes through the sequential deposition of material. More particularly, the invention relates to the consolidation of material increments using friction joining to form objects.

BACKGROUND OF THE INVENTION

Numerous manufacturing technologies for producing objects by sequentially adding material exist, with the casting of liquid metal being perhaps the oldest such technique. In the past two decades, various processes for fabricating objects to net shape solely through material addition, i.e. without a finishing step such as machining to produce detailed, high-precision features, have -been patented and, in a few cases, commercialized.

Most of these additive manufacturing processes either rely on an adhesive, or a solidification process in order to produce a bond between previously deposited material and each incremental volume of material which is added. Although the use of adhesives is convenient, the properties of the adhesive control the properties of the finished object, and this limits the usefulness of such processes in the production of engineering parts and products.

Processes which use solidification transformations result in objects with relatively uniform physical and mechanical properties, because the liquid which is present as each volume of material is added wets the previously deposited material, effectively acting as an adhesive with properties identical to those of the bulk material.

The most commercially successful of these technologies is stereolithography, in which a focused light source (typically an ultraviolet laser) is used to solidify a liquid photocuring polymer. As the laser focal point travels through a vat of liquid polymer, the polymer locally solidifies, and eventually, through appropriate programming of the motion of the focal point, a solid object is built.

Although several techniques have been developed and commercialized, the technologies available for additively producing metal objects are limited. Since the Bronze Age, humans have used forging as a means of producing objects by adding small volumes of material to shapes and hammering them to final dimensions. More recently, three-dimensional arc welding (shape melting), as described and patented by Edmonds et al., (U.S. Pat. No. 4,775,092) has been suggested as an approach to production of net shape metal components.

Prinz, U.S. Pat. No. 5,207,371, has also developed shape deposition modeling in which two types of molten metal are sequentially deposited to produce net shape. Prinz and others have shown that in addition to arc welding, laser deposition and thermal spraying may be used as the basis for forming net shape objects layer by layer, if masks are used at intervals sufficient to define the cross sections of the desired object (See U.S. Pat. No. 5,126,529). Kovacevic has refined the methods of Edmonds and included milling to improve object dimensional accuracy.

Laser melting and deposition have been developed extensively in the U.S. and Germany. Based on cladding technologies developed in the 1980s, processes such as laser engineered net shaping and direct metal deposition are being commercialized (See Lewis, U.S. Pat. No. 5,961,862). Laser direct metal deposition is under development by researchers around the world, including Sandia National Laboratory, Los Alamos National Laboratory, Optomec Inc., and Precision Optical Manufacturing in the United States, and the Fraunhofer Institute in Germany. In essence, the process involves the injection of metal powders into a high power laser beam, while the laser is rastered across a part surface. The powders are melted in the beam, and deposited under the influence primarily of gravity.

Other processes for producing net shape metal objects via material deposition involve the use of low melting point materials to join sheets or powders. For example, brazing of laminated objects has been described (patents) in which steel sheets are cut to the geometries of sequential cross sections of a part, and then furnace brazed together. A copper, titanium or nickel based braze alloy is generally used, with copper alloys having the lowest melting points, and ease of use.

A closely related technique uses infiltration of a low surface tension, low melting point alloy to fill voids in object made by compacting or printing metal powders has also been employed. For example, Cima et al. have patented a three-dimensional printing process, in which metal powders are ink jet printed in layers, and a binder is used to hold the shape of the printed object (U.S. Pat. No. 5,387,380). Following firing of this green part to remove the binder, the infiltrant can be added to produce a solid metal object (Dillon Infiltrated Powdered Metal Composite Article (U.S. Pat. No. 4,327,156). This technique is being commercialized by Extrude Hone Corporation. Other powder metallurgy techniques for producing metal objects to net shape involve the use of a pattern against which powders are densified using various combinations of elevated temperatures and pressures to produce a fully dense, net shape part.

In U.S. Pat. No. 5,578,227, Rabinovich describes a method in which a wire or filament feedstock is used and applied to a growing object while maintaining a substantially identical cross section by remotely heating the nit point at which the feedstock is fed onto and is tangent to the existing surface. Rabinovich proposes use of a laser to heat this location to the melting point.

Electroforming, or plating, has also been commercialized for additive manufacturing of metal components. This mature technology has recently been used to produce shells on near net shape patterns to produce objects, usually tooling inserts for the injection molding process. Electroforming is a very slow process. It typically takes up to two weeks to produce a shell 0.25" thick in a material such as nickel which has sufficient strength and wear resistance to be used as permanent tooling. As a result, this process is used only to create shells which require backfilling by some secondary material. Metal powder filled epoxies are most often used, however, ceramic slurries, other plastics, cements, and low melting points metals have all been used.

Electroforming has other drawbacks besides extremely low deposition rate as a near net shape forming technology. In the electroforming process, metal salts are dissolved in an aqueous solution. When an electrical current passes through this bath, metal is deposited on the negatively charged surface (in net shape electroforming applications such as tooling, this will be a model which is the inverse of the desired final shape). Aqueous solutions of metal salts are generally toxic, and sludges form in these baths as a byproduct of the process. Both the liquid and the sludges are hazardous materials which must be handled and disposed of appropriately. It is noteworthy that Andre has patented a method of fabricating layered structures using masks and electroplating (U.S. Pat. Nos. 5,976,339 and 5,614,075).

More recently, nickel vapor deposition has been employed as a means of producing nickel shells for net shape fabrication applications. Nickel vapor deposition (NVD) allows thicker shells to be produced as deposition rates are higher than electroforming (Milinkovic, 1995). However, NVD involves the use of highly toxic gases and a specialized reaction chamber. The cost and risk of this technology are both very high.

The joining and cladding of metals using friction is a well known technology (Welding Handbook, Vol. 2). Friction processes include inertial welding, linear friction welding, friction surfacing, friction acoustic bonding and friction stir welding. Friction joining processes create heat at the faying surfaces of the materials to be joined, by rubbing the surfaces together. In addition to creating heat, this rubbing removes contaminants and oxide layers creating localized, atomically clean joint surfaces. It is known that the nature of metallic atomic bonds is such that if a very clean surface can be generated and maintained, joints between metals can be formed at relatively low temperature and pressure. Such solid-state consolidation could address many of the shortcomings of net-shape fabrication processes relying on liquid-to-solid transformation.

Friction bonding has been applied previously to the cladding and surfacing of objects for corrosion protection or repair of worn areas. Reference is made to U.S. Pat. No. 5,469,617, 5,183,390, 5,077,081, 4,959,241 and 4,930,675, which disclose various surfacing methods based upon friction bonding. So far, however, the technique has not been applied to object formation.

SUMMARY OF THE INVENTION

This invention resides in the use of friction heating and bonding to consolidate sequentially applied metals, plastics or composites to previously deposited material so as to form a bulk deposit in a desired shape. Monolithic or composite sheets, tapes and filaments may be consolidated using the approach.

In terms of apparatus, a system according to the invention includes a source of friction; a mechanism for applying a forging load between a feedstock power supply and a work surface; a work-head, which may have various configurations depending on the geometry of the feedstock to be used; a material feeding system; and a computer-controlled actuation system which controls the placement of material increments added to an object being built. A computer model of the object to be built is used to generate commands to produce the object additively and automatically.

The technology represents a dramatic improvement over processes now in use. The inventive approach provides a solid, freeform fabrication technique that requires no tooling, operates in the solid state, and creates a bond directly at the faying surfaces (i.e., acts only at the location where bonding/ consolidation of the material increments is desired). It also addresses the problem of hazardous materials and energy sources, and also the engineering problems inherent in the handling of liquid metals.

DETAILED DESCRIPTION OF THE INVENTION

In broad and general terms, this invention facilitates the additive manufacturing net shape objects in metals, plastics and composites by applying and integrally bonding sequential increments of material using friction joining. The material increments are fed sequentially and additively according to a computer-model description of the object, which is generated by a computer-aided design (CAD) system, preferably on a layer-by-layer basis. The CAD system, which holds the description of the object, interfaces with a numerical controller, which in turn controls one or more actuators. The actuators impart motion in multiple directions. Three orthogonal directions may be used or five axes, including pitch and yaw as well as XYZ, may be appropriate for certain applications, so that each increment (i.e., layer) of material is accurately placed in position and clamped under pressure.

The system and method may also incorporate the use of support materials to provide suitable substrates for any features of the object, which, when viewed sectionally, are overhanging. A description of the support resides in the CAD system, enabling the support to be built sequentially and additively. The support is preferably composed of less valuable material which is removed by stripping, cutting, dissolution, or by melting, when material having a lower melting-point than that of the object is used.

Friction joining is a solid-state process and can be performed at temperatures significantly lower than the melting point of the feedstock and the base material. During friction joining, the material must achieve a state of plasticity; in low hot strength materials, this occurs at a lower fraction of the melting point than in materials which are intended to have significant structural strength at elevated temperatures. In general, joint temperatures reach 0.7 to 0.9 of the melting temperature during friction joining.

Since heat is generated only at the surfaces that are to be joined, the process has enormous advantages over existing approaches based upon liquid-solid transformation. Thermal energy is widely diffused in these alternative processes, allowing residual stresses to build up as new layers are deposited. This can result in curling and cracking, and residual stress relief of the objects must be performed.

Frictional object consolidation creates heat only in the immediate interface region, typically a layer only a few microns thick. Thus, minimal heat is generated to produce residual stresses. Because frictional object consolidation occurs in the solid state in metals and plastics, the process minimizes safety and material handling problems which occur when liquid metals are present. In addition, by eliminating the liquid-solid phase transformation the approach allows dramatic improvements in dimensional accuracy.

Figure 1:
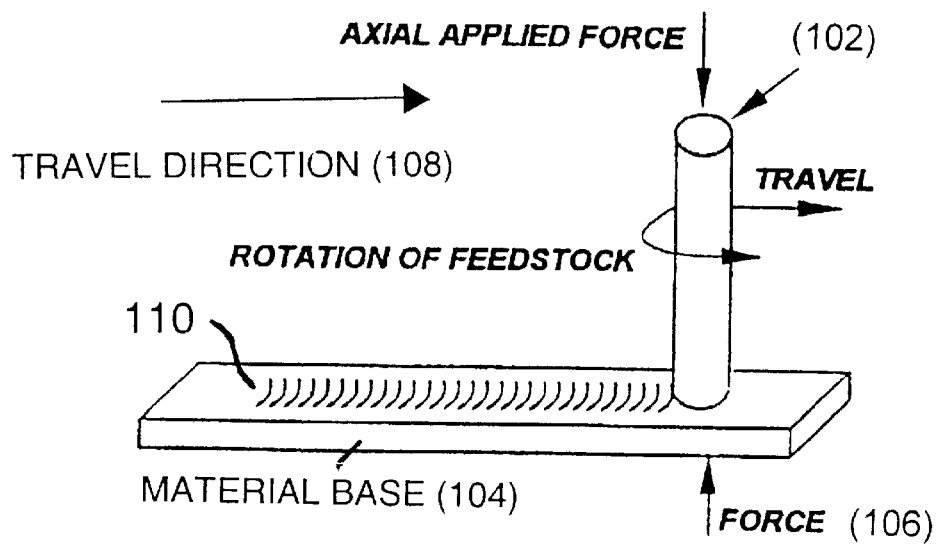
FIG. 1 is a schematic representation that illustrates the frictional object consolidation process.

FIG. 1 is a schematic representation that illustrates the frictional object consolidation process. A feedstock 102 is forced against a material base 104. A ounterforce 106 is preferably applied relative to the feedstock 102 as well. The feedstock 102 is moved in a direction 108, thereby leaving material increments 110 in accordance with a description of an object to be fabricated. The feed is preferably rotated in addition to the lateral translation to intensify the generation of localized frictional heating.

The use of friction for forming metallurgical bonds is used primarily in the ground vehicles and piping industries, and is little known outside of it. In most applications, friction joining is used in relatively low precision operations on parts with large cross sections. In friction surfacing applications large diameter feed stocks (on the order of 10cm in diameter or more) are typically employed. This reduces the chances of buckling as the feedstock is axially loaded.

However, in additive manufacturing, accuracy is a function of the size, thickness, and accuracy of placement of each increment of material added. Typically material is added in layers of 0.001 to 0.005" in thickness so as to achieve the desired dimensional accuracy. For friction object consolidation, this requires that small diameter feedstocks be used, and that a material feeding technique which provides support to the small diameter wire be used.

Figure 2:
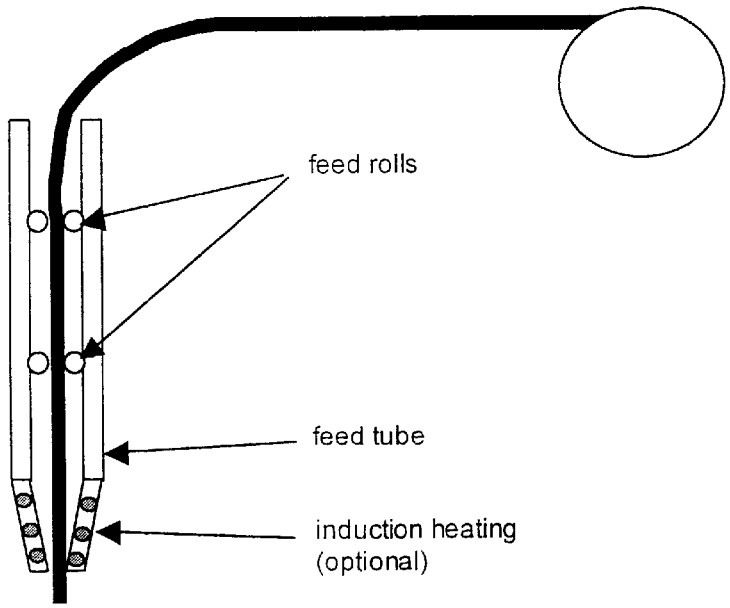
FIG. 2 depicts a feed head which continuously feeds raw material.

Friction surfacing techniques may be scaled down to support additive solid free form fabrication. For the purposes of net shape free form fabrication, it is desirable to minimize the cross section of the deposit material. This has two beneficial aspects. First, it is a requirement for dimensional control. Second, as the cross section of the deposit material decreases, the applied load decreases as the square of the radius. For example, suppose a load of 5,000 pounds is required to use a mild steel rod one-inch in diameter as a friction surfacing material. A wire with a diameter of 0.1" will require a load of only 50 pounds to achieve the same force at the bonding surface. In order to prevent buckling, a feed head which continuously feeds the material, and limits the unsupported length of material between the material feed and the work surface is required. Such as system is illustrated in FIG. 2.

Figure 3:
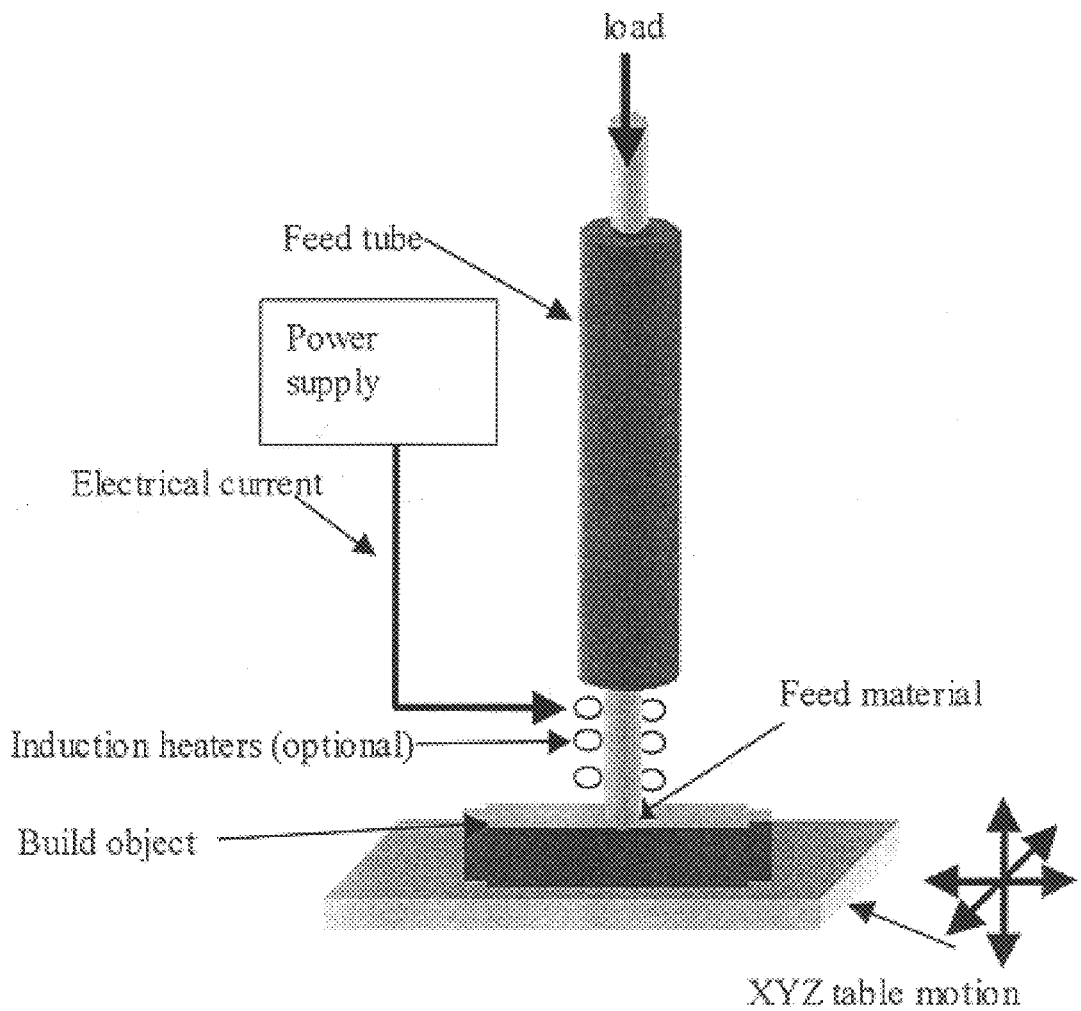
FIG. 3 is a drawing which illustrates the optional use of heating in a friction consolidation system according to the invention.

Friction surfacing requires that the consumable material flow plastically under the applied load. By preheating the consumable material, the force required to induce plastic flow may be reduced. Thus the incorporation of resistance, induction or some other form of heating in the friction surfacing system may be valuable, as illustrated in FIG. 3.

Figure 4:
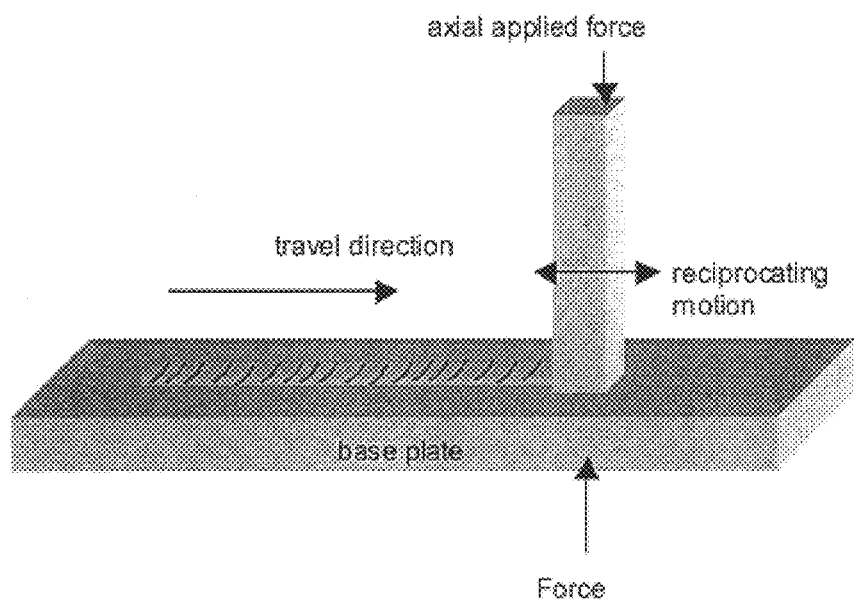
FIG. 4 is a drawing which illustrates how a feedstock is preferably moved reciprocally in a linear friction welding process.

The linear generation of friction energy permits friction bonding techniques to work with materials which do not have axi-symmetric cross sections. As a means of performing additive manufacturing, feedstocks possessing a rectangular cross section have advantages over circular feedstocks, since the location and width of the material applied can be more accurately controlled. In linear friction welding, the feedstock is preferably moved reciprocally, as shown in FIG. 4. Friction joining may also be accomplished through orbital motion of a feedstock on a base plate, or by rotation to and fro of the feedstock through a given angle, preferably less than 360 degrees.

Friction Acoustic Bonding

Figure 5:
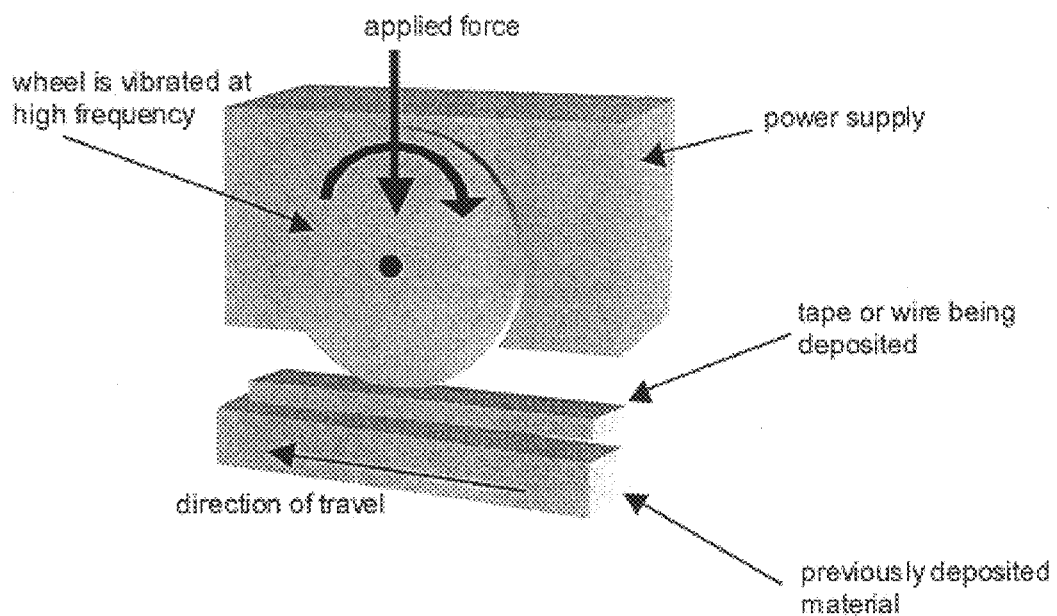
FIG. 5 is a drawing which illustrates an application of friction acoustic bonding to additive manufacturing.

Friction acoustic bonding is a related friction joining technology which is well suited to additive manufacturing. It is performed by exciting a tool to vibrate at high frequencies (in the audible or ultrasonic range). When the tool transmits these high frequency vibrations under load through a material being added to a workpiece, friction occurs at the interface, and a joint can be formed. This is illustrated in FIG. 5.

Friction acoustic bonding may be practiced using a variety of feedstocks. For example, metal foil may be laminated to build an object. The foil material may be supplied in sheets or fed from a roll, and may be consolidated into layers and cut according to the required geometry following consolidation, or it can be cut, then consolidated. Additional materials may be applied around precut foils to supply a support structure. Using this technology, fully dense articles may be fabricated out of a single material without use of an adhesive or secondary processing.

Figure 6A:
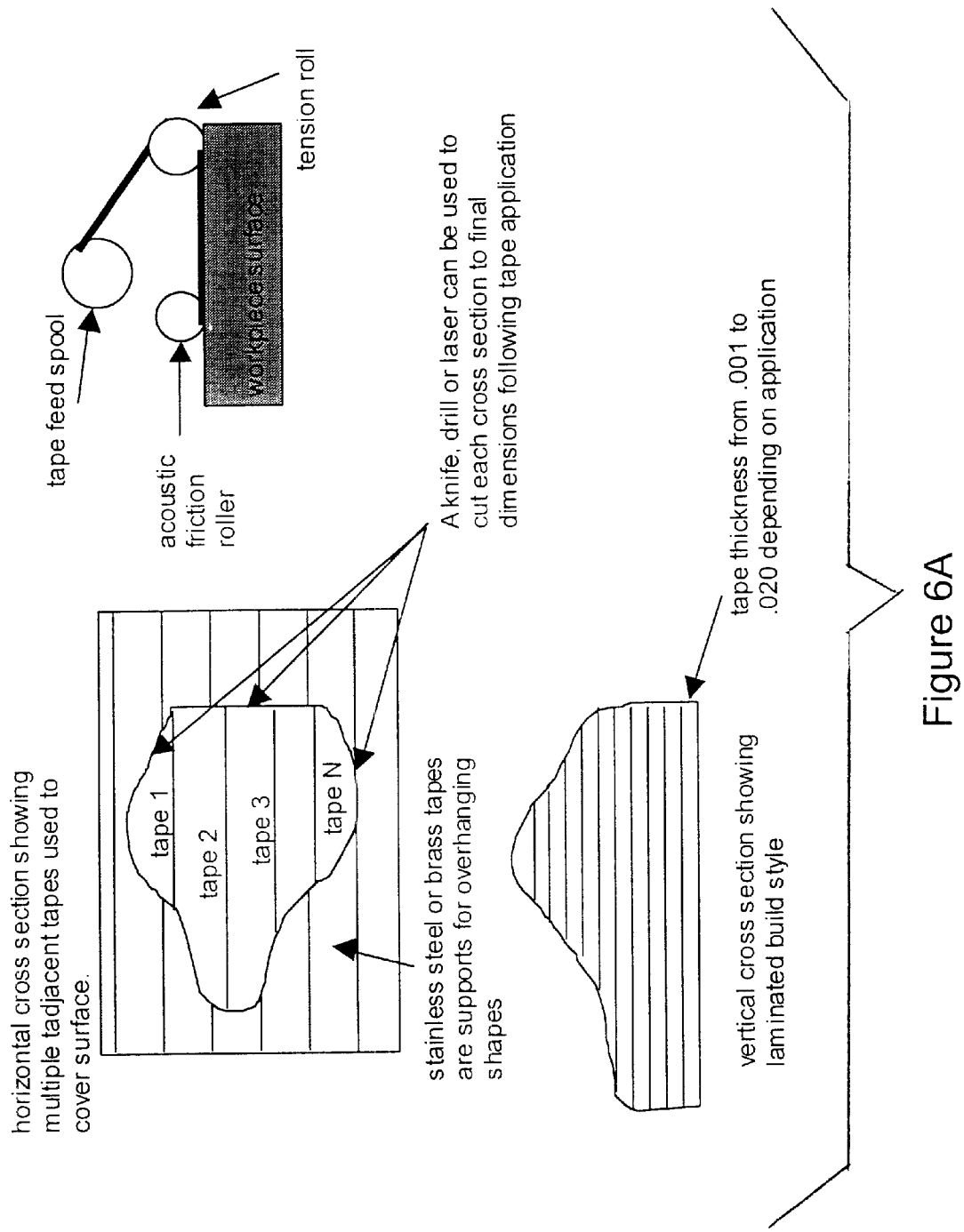
FIGS. 6A and 6B show machines suitable to friction acoustic bonding.
Figure 6B:
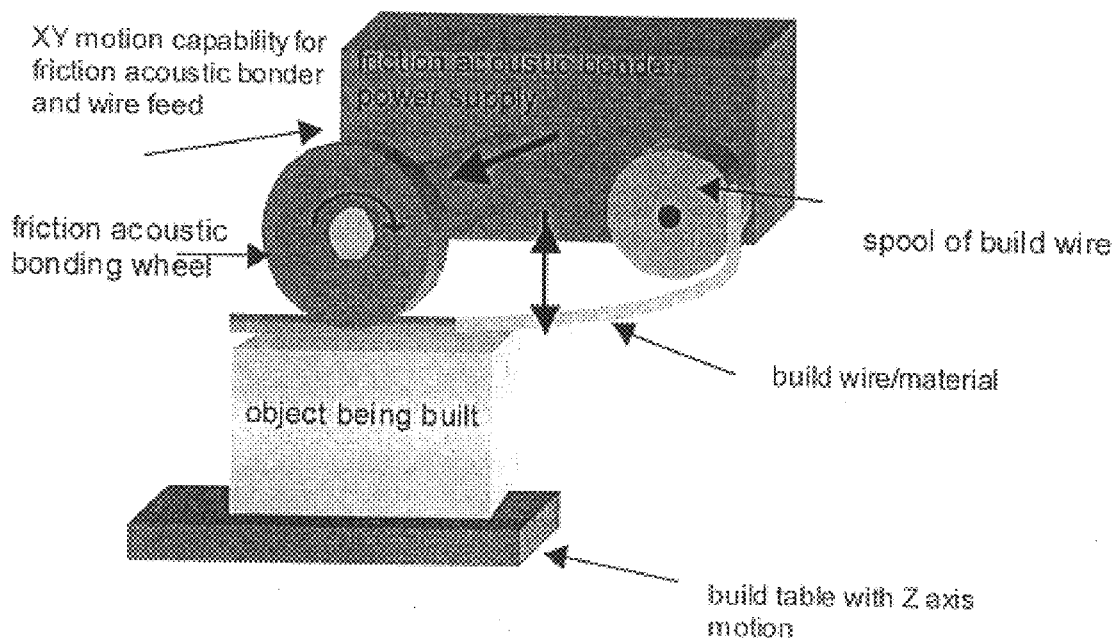

One particularly advantageous embodiment of object consolidation using the friction acoustic bonding methods is in a tape lay-up machine, as shown in FIGS. 6A and 6B. Use of tapes 1–2" wide instead of sheet material the full width of the desired part eliminates difficulties encountered in maintaining uniform tension across a wide sheet of feedstock, and also problems with ensuring uniform pressure and or energy is applied by a very wide wheel or roller. In addition, narrower tapes are more easily handled by machines and human operators than larger, heavier feedstock supplies.

To a limited extent frictionally consolidated objects can also be produced via a "dot-wise" application. That is, the system can be designed so that individual dots of material smaller than a millimeter in diameter can be applied sequentially. This enables accurate build geometry, and, because friction bonding works with so many engineering metals, allows the fabrication of gradient compositions as described later. For example, using friction joining, molybdenum (Mo) can be joined to both copper (Cu) and aluminum (Al) both of which are impossible to alloy with molybdenum, or easily join with it, using conventional technologies.

Using dot-wise application, an object composed of multiple materials in virtually any desirable composition may be fabricated. As in the tape application, a wire or tape feedstock, which could possess one of a variety of cross sections, could be used to produce the articles. The friction application system would in essence smear tiny dots of material onto the build surface of the object, adding small increments of material with each cycle. Orbital material application lends itself readily to this type of application of friction additive manufacturing.

Figure 7:
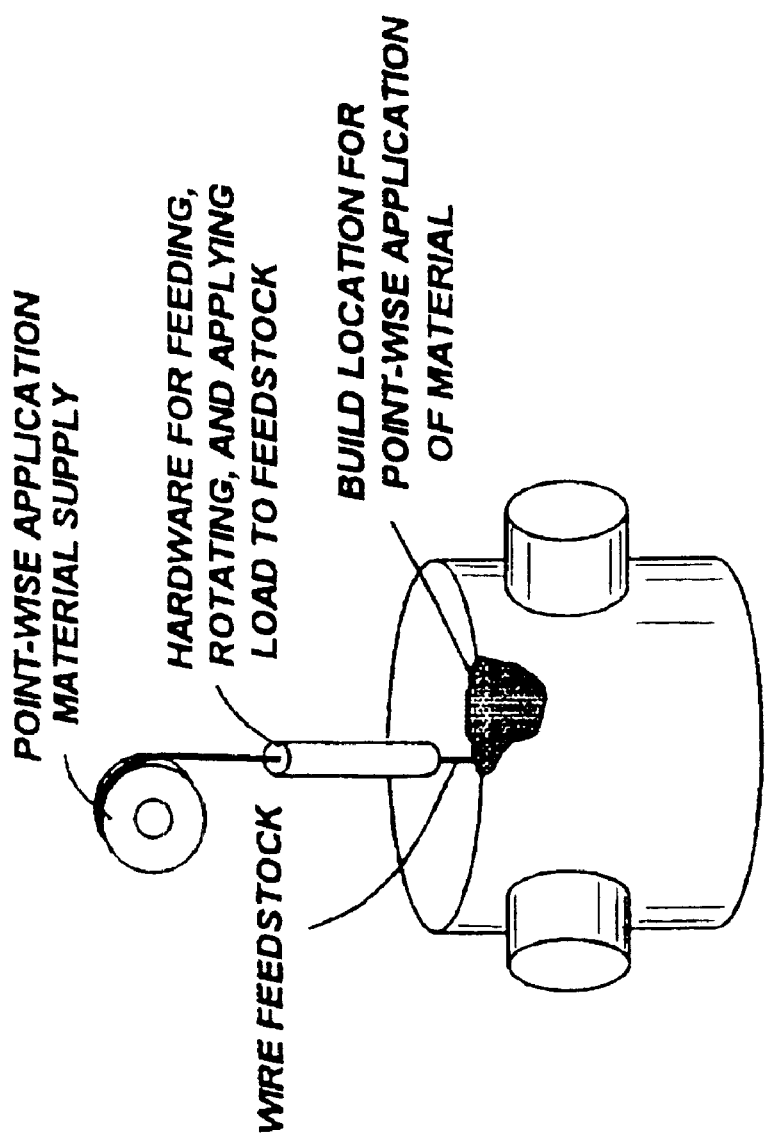
FIG. 7 shows how a wire feed stock may be supported by a feed tube, to feed small amount of free material.

As shown in FIG. 7, the wire feed stock is preferably supported by a feed tube, and a small amount of free material (approximately 0.002–0.008") is fed out of the tube. Because only a short unsupported volume of material is fed, buckling risk is minimized as a load is applied, and the wire is rotated to and fro through an angle of 45 to 135 degrees approximately. As plastic flow occurs (in 100 to 500 milliseconds) and abond is produced between the feedstock and the build surface, the wire is retracted from the surface, leaving a dot of material. The feed tube indexes over to the next location and repeats the process.

Figure 8:
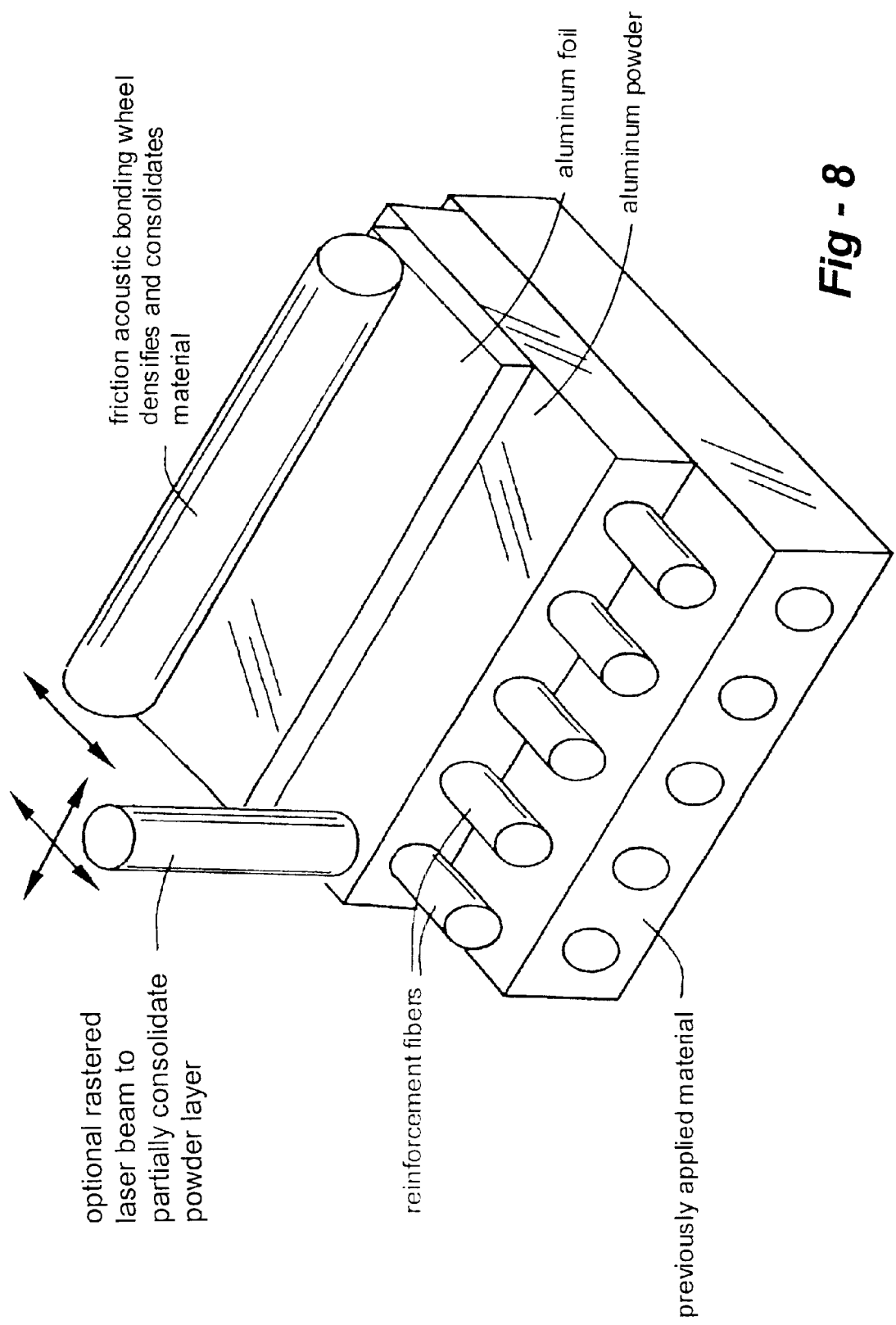
FIG. 8 illustrates a means of employing friction object consolidation to prepare continuously fiber reinforced metal matrix composite tapes or net shape objects.

Friction consolidation also enables the net shape fabrication of objects made from various composite materials. For instance, the fabrication of continuously ceramic reinforced metal matrix composites has proven very difficult and costly using conventional metallurgical techniques. When exposed to molten metal, the ceramic fibers are typically subject to thermal shock, which causes cracking of the fibers, and results in reduced mechanical properties in the composites. Thus a further preferred embodiment of the invention is illustrated in FIG. 8, which illustrates a means of employing friction object consolidation to prepare continuously fiber reinforced metal matrix composite tapes or net shape objects.

A further application and embodiment of friction consolidation to additive manufacturing lies in the overhaul and repair of existing objects. In aerospace and military applications, power generation, tool and die fabrication, mining and certain food processing applications, components which are large, costly and unique may wear in service. Repair of such articles may be difficult using conventional weld build up techniques (particularly in military and aerospace applications where difficult to join materials are often used). However, total replacement of such components is often cost prohibitive. Because of the relatively low temperatures involved, friction consolidation is well suited to additive manufacturing applied to overhaul and repair. An automated dot-wise application system as described above can be used to add material in worn locations using CAD data to drive dot application locations.

Figure 9:
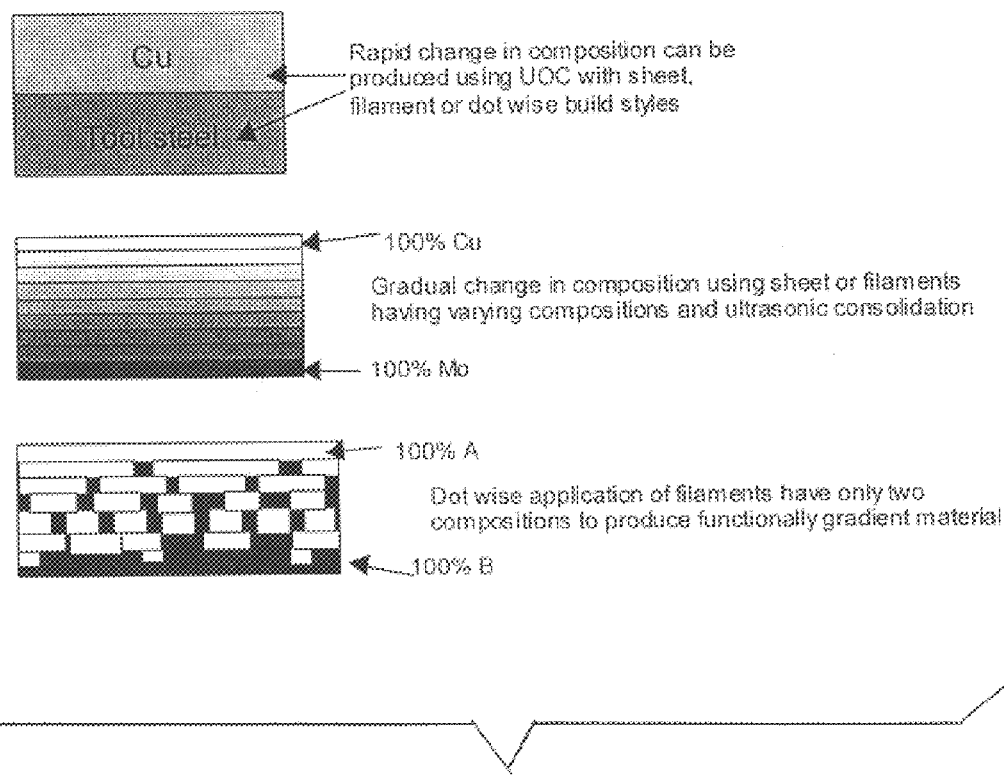
FIG. 9 illustrates the concept of functionally gradient materials.

Functionally gradient materials are those in which material composition is varied, whether rapidly or gradually, in order to allow a single component to more efficiently meet engineering service requirements. FIG. 9 illustrates the concept. Examples of relevant applications of functional composition gradients include injection molding tools in which a copper zone is co-fabricated with the tool steel (for example by electroplating, or laser direct metal deposition), in order to improve heat transfer in certain locations. Other examples are found in the hot zones of turbine engines and rocket motors, where it may be desirable to have a gradual gradient between a metal and a ceramic, or a metal and an intermetallic compound so that certain areas of a part feature enhanced heat resistance, while others have excellent ductility. Fabrication of functionally gradient materials often presents difficulties, because the materials may be metallurgically incompatible in the case of rapid variation, or because certain compositions may be very difficult to fabricate in the case of gradual variation.

Friction-based additive manufacturing has certain benefits relative to the preparation of functionally gradient, net shape objects in comparison to previous techniques. The low temperature, solid-state nature of the process means that materials which are very difficult produce metallurgical bonds between using conventional fusion approaches can be joined in a more straightforward manner. For example, copper and steel, which tend to crack when joined using fusion methods, can be consolidated using thermal energy produced via force and friction. In addition, the dot-wise approach described above for friction object consolidation can be used to add material of many gradually varying compositions to themselves and each other to produce a wide range of compositions, or feed stocks of two widely disparate compositions can be applied in gradually varying amounts to produce a functionally gradient zone. Due to limitations on the diameter of feedstocks which can be used without causing buckling, a relatively coarse functionally gradient composite will be produced using the friction consolidation technique.

The methods illustrated in the previous to produce layered or point-wise material application can be used in this application. Specifically, wires, filaments or sheets of varying composition (depending on the application method used as depicted above) can be employed as feedstocks, and selected and applied to result in various gradient compositions in the finished material.

I claim:

1. A method of fabricating an object through sequential material deposition, comprising the steps of:
   providing a description of the object to be fabricated;
   providing a material feedstock;
   sequetially depositing increments of the material and consolidating the increments in accordance with the description of the object using frictional energy to create a localized plastic flow, mushy zone, or melted region at the interface between the previously deposited material and each new increment until the object is formed without melting the material in bulk; and
   removing any excess material.

2. The method of claim 1, further including the step of applying pressure to the material increments during consolidation.

3. The method of claim 1, further including the step of applying heat to the increment prior to consolidation.

4. The method of claim 1, further including the step of inducing high-frequency acoustic vibrations the increment during the consolidation thereof.

5. The method of claim 1, wherein the material is provided in the form of sheets, elongated tapes, filaments, dots or droplets.

6. The method of claim 1, wherein material increments define a discontinuous or gradual change in material composition.

7. The method of claim 1, wherein the description of the object is provided in the form of a computer-aided design or manufacturing (CAD/CAM) file.

8. The method of claim 1, wherein the process passes the energy through the material increment during the deposition thereof.

9. The method of claim 1, wherein the material is provided in the form of thin layers, and one or more of the layers are cut into a shape corresponding to the description of the object prior to the step of consolidating the layer.

10. The method of claim 1, wherein the material is provided in the form of thin layers, and one or more of the layers are consolidated then trimmed in accordance with the description of the object.

11. The method of claim 1, wherein the material is provided in the form of a plurality of thin layers which a re consolidated one layer at a time.

12. The method of claim 1, wherein alternating layers of reinforcement fibers and metallic powders, foils, or a combination thereof, are used to fabricate a metal-matrix composite object.

13. The method of claim 1, wherein:
   the material is provided in the form of a tape having a width; and
   the description of the object takes the width of the tape into account.

14. The method of claim 1, wherein:
   the object includes an overhanging, cantilevered or enclosed feature, and
   support material is used to support the feature.

15. The method of claim 14, wherein the support material has a melting point which is different than the material used to form the object.

16. The method of claim 15, wherein the support material is:
   an alloy including solders, copper-based brazes, nickel-based brazes or titanium-based brazes, or a granular ceramic or other electrically insulating material, including silica, zirconia, alumina, salts, clays, plasters.

17. The method of claim 1, further including the step of providing a computer-controlled actuation system operative to automatically place the material layers in position prior to consolidation.

18. The method of claim 1, wherein the object is a repair of an existing article.

19. A system for fabricating an object using sequential material deposition, comprising:

a memory for storing a description of the object;

a material feeder for providing material increments with faying surfaces therebetween;

a source of frictional energy operative to join the material increments without melting the material in bulk; and a controller operative to coordinate the successive deposition of material increments through the material feeder and control the source of energy to consolidate the material in accordance with the description of the object.

20. The system of claim 19, further including an actuation system for imparting relative motion between the material feeder and energy source.

21. The system of claim 19, further including a material-removing unit for removing excess material not required to form the object.

22. The system of claim 19, wherein the material-removing unit includes a knife, drill, laser beam, milling machine or ultrasonic machining tool.

23. The system of claim 19, wherein the feeder is operative to provide the material in the form of sheets, tapes, filaments, dots or droplets.

24. The system of claim 19, further including:

a support-material feeder; and a support-material removing unit for removing excess support material not required to form the object.

25. The system of claim 19, wherein the object is a repair to an existing article.

* * * * *

UNITED STATES PATENT AND TRADEMARK OFFICE
CERTIFICATE OF CORRECTION

PATENT NO. : 6,457,629 B1
DATED : October 1, 2002
INVENTOR(S) : Dawn White

It is certified that error appears in the above-identified patent and that said Letters Patent is hereby corrected as shown below:

Column 8,
Line 13, after "between" delete -- the --.
Line 45, replace "a re" with -- are --.

Signed and Sealed this

Twenty-fifth Day of February, 2003

JAMES E. ROGAN
*Director of the United States Patent and Trademark Office*